US012722399B2

(12) United States Patent
Knipp et al.

(10) Patent No.: US 12,722,399 B2
(45) Date of Patent: Sep. 1, 2026

(54) PERSONALIZED IDENTIFICATION DOCUMENT PROCESSING SYSTEMS AND METHODS

(71) Applicant: Entrust Corporation, Shakopee, MN (US)

(72) Inventors: Roman Knipp, Shakopee, MN (US); Pauline Ukpabi, Shakopee, MN (US); Utpal Vaidya, Shakopee, MN (US); Ryan Schwiderski, Shakopee, MN (US); Matthew Stebbins, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 18/459,164

(22) Filed: Aug. 31, 2023

(65) Prior Publication Data

US 2024/0075751 A1 Mar. 7, 2024

Related U.S. Application Data

(60) Provisional application No. 63/374,302, filed on Sep. 1, 2022.

(51) Int. Cl.
*B41J 2/325* (2006.01)
*B41J 3/407* (2006.01)

(52) U.S. Cl.
CPC ............... *B41J 2/325* (2013.01); *B41J 3/407* (2013.01)

(58) Field of Classification Search
CPC .................................. B41J 2/325; B41J 3/407
(Continued)

(56) References Cited

U.S. PATENT DOCUMENTS 4,738,555 A * 4/1988 Nagashima .............. B41J 2/325 347/215
4,825,054 A 4/1989 Rust et al.
(Continued)

FOREIGN PATENT DOCUMENTS

GB 2419110 A 4/2006
JP 2001253963 A 9/2001
(Continued)

OTHER PUBLICATIONS

International Search Report dated Dec. 8, 2023 for International Application No. PCT/B2023/058672.
(Continued)

*Primary Examiner* — Jason S Uhlenhake
*Assistant Examiner* — Alexander D Shenderov
(74) *Attorney, Agent, or Firm* — Merchant & Gould P.C.

(57) ABSTRACT

A personalized identification document processing system includes a print station that includes a thermal print head and a print ribbon that is engageable by the thermal print head to thermally transfer material from the print ribbon to personalize the plastic identification document. The print ribbon includes a repeating sequence of panels of thermally transferrable material, with each sequence of panels including at least one panel of thermally transferrable color material followed by at least one panel of thermally transferrable radiation curable protective topcoat material. The color material and the topcoat material are applied to the plastic identification document in a printing process, with the topcoat material applied over at least a portion of the color material. The topcoat material is then cured and once cured enhances the durability of the color material.

23 Claims, 7 Drawing Sheets

(58) Field of Classification Search
USPC .......................................................... 347/179
See application file for complete search history.

(56) References Cited

U.S. PATENT DOCUMENTS

| | | | | |
|---|---|---|---|---|
| 4,995,501 | A | 2/1991 | Lundstrom et al. | |
| 5,266,781 | A | 11/1993 | Warwick et al. | |
| 5,837,991 | A | 11/1998 | LaManna et al. | |
| 6,001,893 | A * | 12/1999 | Vaidya | C09D 4/06 522/182 |
| 6,131,817 | A | 10/2000 | Miller | |
| 6,783,067 | B2 | 8/2004 | Kreuter et al. | |
| 6,902,107 | B2 | 6/2005 | Shay et al. | |
| 7,398,972 | B2 | 7/2008 | Schuller et al. | |
| 7,434,728 | B2 | 10/2008 | Paulson et al. | |
| 10,131,177 | B2 | 11/2018 | Knipp et al. | |
| 10,889,129 | B2 | 1/2021 | Beech | |
| 11,123,958 | B2 | 9/2021 | Sargeant et al. | |
| 2002/0155266 | A1* | 10/2002 | Stofko | B41M 5/38207 428/216 |
| 2003/0020798 | A1* | 1/2003 | Taylor | B41M 7/0081 347/187 |
| 2003/0035045 | A1* | 2/2003 | Miki | B41M 5/38257 347/213 |
| 2006/0171755 | A1* | 8/2006 | Clarke | B41J 3/54 400/120.02 |
| 2007/0187870 | A1 | 8/2007 | Lundstrom et al. | |
| 2009/0000733 | A1 | 1/2009 | Berndtsson | |
| 2010/0151207 | A1 | 6/2010 | Hansen et al. | |
| 2016/0096394 | A1 | 4/2016 | Vaidya et al. | |
| 2016/0300128 | A1 | 10/2016 | Alvig et al. | |
| 2017/0228632 | A1* | 8/2017 | Knipp | B42D 25/305 |
| 2018/0194144 | A1* | 7/2018 | Beech | B41J 13/12 |
| 2018/0345705 | A1 | 12/2018 | Lien | |
| 2020/0338902 | A1 | 10/2020 | Beech | |
| 2022/0080743 | A1 | 3/2022 | Knipp et al. | |
| 2022/0194094 | A1 | 6/2022 | Paulson et al. | |

FOREIGN PATENT DOCUMENTS

| | | |
|---|---|---|
| WO | 2018215420 | 11/2018 |
| WO | 2024047607 A1 | 3/2024 |

OTHER PUBLICATIONS

Extended European Search Report issued in corresponding European Patent Application No. 23859610.0, Jul. 30, 2026, 12 pages.

* cited by examiner

PERSONALIZED IDENTIFICATION DOCUMENT PROCESSING SYSTEMS AND METHODS

FIELD

This technical disclosure relates to processing personalized plastic identification documents such as personalized plastic cards and plastic pages of passports, and increasing the durability of printing on the personalized plastic identification documents.

BACKGROUND

Identification documents such as identification cards, credit and debit cards, driver's licenses, and the like, and passports, are personalized with information concerning the intended holder of the identification document and then issued to the intended holder. The durability of printing applied to the identification documents is important in order to extend the life of the identification documents.

SUMMARY

Personalized identification document processing systems and methods are described that produce personalized plastic identification documents with highly durable printing while minimizing print ribbon waste and maintaining document processing speeds and system throughput.

In an embodiment, a personalized identification document processing system described herein includes a print station that includes a thermal print head and a print ribbon that is engageable by the thermal print head to thermally transfer material from the print ribbon to personalize the plastic identification document. The print ribbon includes thermally transferrable radiation curable protective topcoat material that is dry to the touch or substantially dry to the touch. The topcoat material is applied to the plastic identification document in a printing process, with the topcoat material applied over at least a portion of color material previously print on the document. The topcoat material is then cured and once cured enhances the durability of the printed color material.

In another embodiment, a first print station is provided that prints thermally transferrable color material from a print ribbon, and a second print station is provided that prints thermally transferrable radiation curable protective topcoat material from a second print ribbon.

Radiation curing of a coating increases the coating toughness. If a topcoat material is fully cured before transfer to the identification document from the print ribbon, the topcoat material does not break cleanly around the edges of the identification document, causing undesired extra material to transfer along the identification document edges. One way of preventing transfer of such extra material is to reduce the thickness of the cured topcoat material, making it less tough. However, the reduced thickness also reduces the overall durability of the printing underlying the topcoat material. To overcome this deficiency, the topcoat material described herein is first transferred to the identification document before being radiation cured. The uncured topcoat material being less tough, transfers to the identification document cleanly, even at a desired higher thickness, without transferring undesired extra material. The transferred topcoat material on the identification document is then radiation cured to enhance its toughness and durability. This approach results in clean transfer of the topcoat material while maintaining the desired durability of the final printed identification document.

In one embodiment, a personalized identification document processing system includes a document input that is configured to input a plastic identification document to be processed onto a document transport path to create a personalized plastic identification document, and a print station along the document transport path. The print station includes a thermal print head and a print ribbon that is engageable by the thermal print head to thermally transfer material from the print ribbon to personalize the plastic identification document. The print ribbon includes thermally transferrable radiation curable protective topcoat material that is dry to the touch or substantially dry to the touch. A radiation curing station is disposed along the document transport path and that is configured to apply radiation to thermally transferrable radiation curable protective topcoat material applied to the plastic identification document from the print ribbon to cure the thermally transferrable radiation curable protective topcoat material on the plastic identification document. The system further includes a document output along the document transport path that is configured to receive the plastic identification document, and a document transport mechanism that is configured to transport the plastic identification document along the document transport path.

In another embodiment, a method of processing a plastic identification document in a personalized identification document processing system includes inputting the plastic identification document to be processed onto a document transport path, and transporting the plastic identification document into a print station located along the document transport path. The print station includes a thermal print head and a print ribbon that is engageable by the thermal print head to thermally transfer material from the print ribbon to personalize the plastic identification document, with the print ribbon including thermally transferrable radiation curable protective topcoat material that is dry to the touch or substantially dry to the touch. Thermally transferrable radiation curable protective topcoat material is applied from the print ribbon onto the plastic identification document, with at least some of the applied thermally transferrable radiation curable protective topcoat material overlapping color material previously applied to the document. Thereafter, the plastic identification document is transported into a radiation curing station along the document transport path, and radiation is applied to the applied thermally transferrable radiation curable protective topcoat material to cure the applied thermally transferrable radiation curable protective topcoat material. Thereafter, the plastic identification document is transported to a document output and the plastic identification document is output.

The identification documents described herein can be personalized plastic identification cards or plastic pages of passports. Personalized plastic identification cards described herein include, but are not limited to, financial (e.g., credit, debit, or the like) cards, access cards, driver's licenses, national identification cards, and business identification cards, and other plastic identification cards that can benefit from having high durable printing described herein. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

DRAWINGS

FIG. 1 schematically depicts an example of a personalized document processing system described herein.

FIG. 2 schematically depicts another example of a personalized document processing system described herein.

Figure 10:
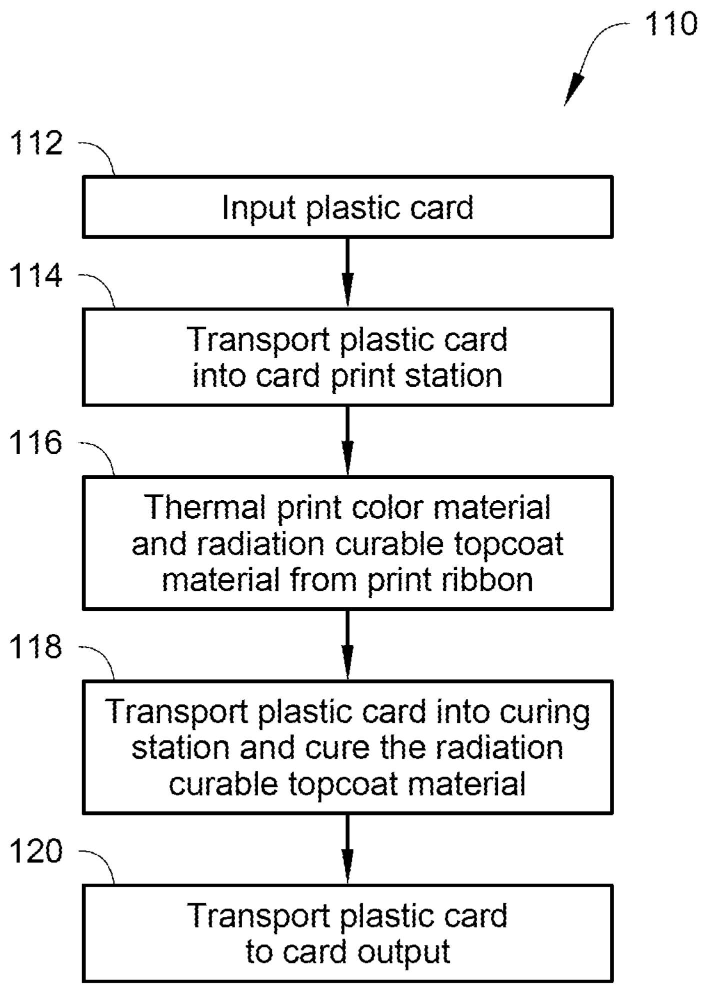

FIG. 10 schematically depicts a method of processing a plastic document in a personalized document processing system described herein.

DETAILED DESCRIPTION

Figure 1:
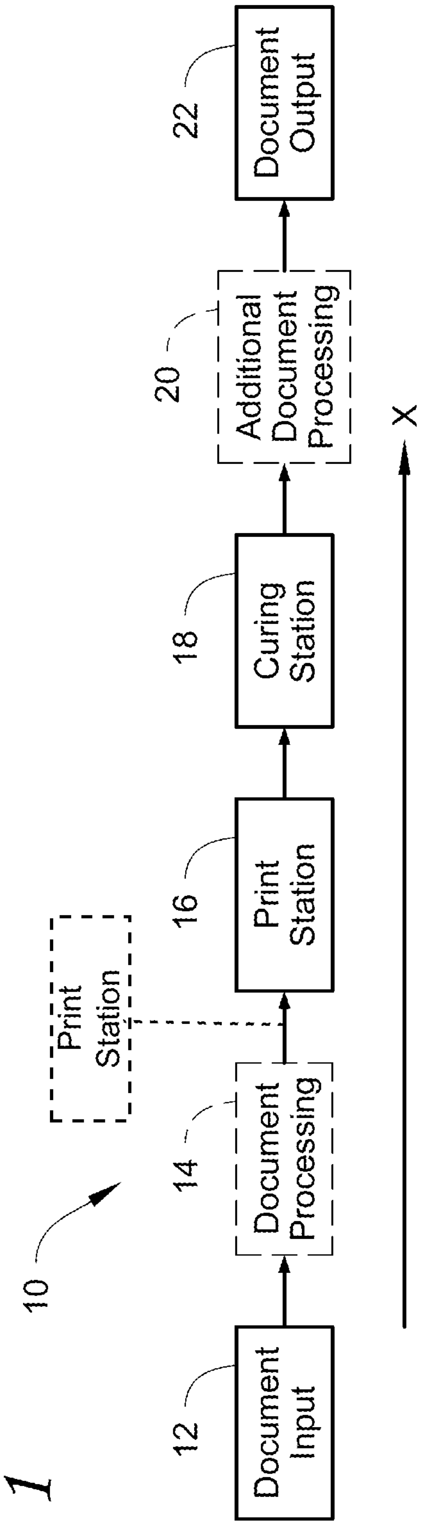
Figure 2:
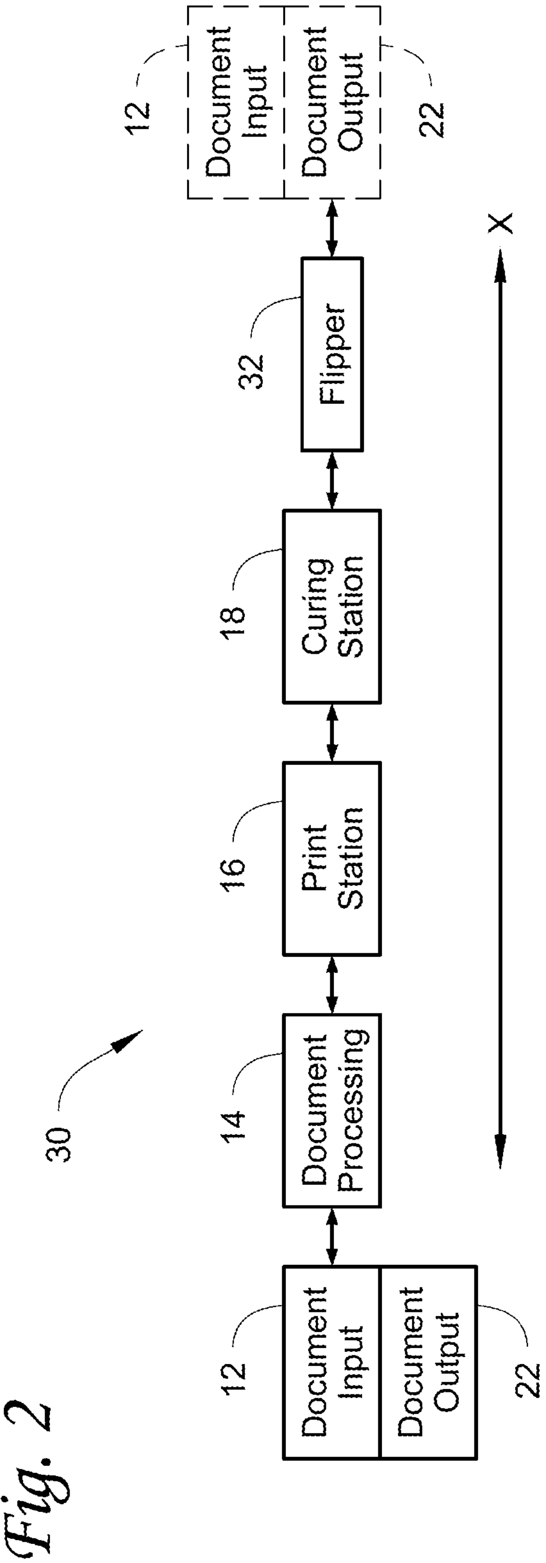

FIGS. 1 and 2 illustrate two examples of personalized identification document processing systems that can be used to produce personalized plastic identification documents. The systems output personalized plastic identification documents with highly durable printing thereon. Identification documents include personalized plastic identification cards and plastic pages of passports. Personalized plastic identification cards described herein include, but are not limited to, financial (e.g., credit, debit, or the like) cards, access cards, driver's licenses, national identification cards, and business identification cards, and other plastic identification cards that can benefit from having one or more security features described herein added to the plastic card. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

For sake of convenience in describing the concepts herein, the following description and the drawings describe the identification document as being a plastic card. However, as indicated above, the techniques described herein are applicable to plastic pages of passports.

The term "plastic identification document" or "plastic identification card" as used throughout the specification and claims, unless indicated otherwise, refers to identification documents such as plastic cards where the document substrate can be formed entirely of plastic, or formed of a combination of plastic and non-plastic materials. In one embodiment, the cards can be sized to comply with ISO/IEC 7810 with dimensions of about 85.60 by about 53.98 millimeters (about 3% in×about 2⅛ in) and rounded corners with a radius of about 2.88-3.48 mm (about ⅛ in). As would be understood by a person of ordinary skill in the art of plastic identification cards, the cards are typically formed of multiple individual layers that form the majority of the card body or the card substrate. Similarly, the term "plastic page" of a passport refers to passport pages where the passport can be formed entirely of plastic, or formed of a combination of plastic and non-plastic materials. An example of a plastic passport page is the data page in a passport containing the personal data of the intended passport holder. The passport page may be a single layer or composed of multiple layers. Examples of plastic materials that the card or passport page, or the individual layers of the card or passport can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics. In an embodiment, the card or passport page can be formed primarily of a biodegradable material such as one or more biodegradable plastics, paper/cardboard, or other biodegradable material(s). In an embodiment, the card can be a metal card formed partially or entirely of metal.

As used herein, the term "processing" (or the like) as used throughout the specification and claims, unless indicated otherwise, is intended to encompass operations performed on a card that includes operations that result in personalizing the card as well as operations that do not result in personalizing the card. An example of a processing operation that personalizes the card is printing the cardholder's image or name on the card. An example of a processing operation that does not personalize the card is applying a laminate to the card or printing non-cardholder graphics on the card. The term "personalize" is often used in the card industry to refer to cards that undergo both personalization processing operations and non-personalization processing operations.

FIG. 1 is a schematic depiction of one embodiment of a large volume batch production document processing system 10 that can be used to process plastic identification cards (and passports) described herein. The document processing system 10 is configured to process multiple documents at the same time, with the documents being processed in sequence, with the documents proceeding generally along a document transport direction/transport path X. The type of system 10 depicted in FIG. 1 is often referred to as a central issuance processing system that processes documents in high volumes, for example on the order of high hundreds or thousands per hour, and employs multiple processing stations or modules to process multiple documents at the same time to reduce the overall per document processing time. Examples of such large volume document processing machines include the MX and MPR family of central issuance processing machines available from Entrust Corporation of Shakopee, Minnesota. Other examples of central issuance processing machines are disclosed in U.S. Pat. Nos. 4,825,054, 5,266,781, 6,783,067, and 6,902,107, all of which are incorporated herein by reference in their entirety.

The system 10 in FIG. 1 can include a document input 12, one or more optional document processing stations 14 downstream from the document input 12, a print station 16, a radiation curing station 18, one or more optional additional document processing stations 20, and a document output 22. The system 10 can include additional processing stations as would be understood by persons of ordinary skill in the art.

The document input 12 can be configured to hold a plurality of plastic cards or passports waiting to be processed and that mechanically feeds the documents one by one into the system 10 using a suitable document feeder. In one embodiment, the document input 12 can be an input hopper. In another embodiment, the document input 12 can be an input slot through which individual documents are manually or automatically fed for processing. The documents are initially introduced into the one or more optional document processing stations 14 if they are present in the system. The stations 14, if present, can include a chip testing/programming device that is configured to perform contact or contactless testing of an integrated circuit chip on each document to test the functionality of the chip, as well as program the chip. Testing the functionality of the chip can include reading data from and/or writing data to the chip. In one embodiment, the chip testing/programming device can be configured to simultaneously program the chips on a plurality of cards. The construction and operation of chip testing/programming devices in document processing systems is well known in the art. The stations 14 can also include a magnetic stripe read/write testing device (when the documents are cards) that is configured to read data from and/or encode data on a magnetic stripe on each card (if the cards include a magnetic stripe). The construction and operation of magnetic stripe read/write testing devices in document processing systems is well known in the art.

The print station 16 can be any type of thermal printing mechanism that can print using the print ribbons described herein. For example, the print station 16 can be configured to perform direct-to-card thermal transfer printing (described further below in FIG. 4) or retransfer printing (described further below in FIG. 5).

In an embodiment, two or more print stations 16 can be provided, one print station 16 performing color printing (monochromatic or multi-color) as described further below and the other print station 16 performing printing of the topcoat described further below. In FIG. 1, the print station that performs color printing can be the print station depicted in broken lines, while the print station that prints the topcoat can be the print station depicted in solid lines. The print stations 16 can be disposed in sequence with one another in the system with the print station 16 that performs color printing followed by the print station that prints the topcoat, or the print stations 16 can be separated from one another by one or more intervening mechanisms, such as a curing station like the curing station 18 described below. In addition, a curing station like the curing station 18 can be associated with each one of the print stations, for example in a sequence such as color printing print station, followed by one curing station, followed by the topcoat print station, followed by another curing station. However, other arrangements are possible, for example the two print stations could share the same curing station. In addition, the color material and the topcoat can be printed using separate ribbons and separate print heads that are part of the same print station.

The curing station 18 is configured to generate and apply radiation, such as ultraviolet radiation or other radiation, to radiation curable material, such as radiation curable topcoat material, applied to the card in the print station 16 to cure the radiation curable material. The curing station 18 can include a curing lamp that includes at least one radiation source or radiation emitter that emits radiation. In one embodiment, the curing lamp can be formed by one or more light emitting diodes (LEDs) that emit UV light. Additional examples of radiation sources include, but are not limited to, one or more Xenon pulsed light sources, one or more high pressure lamps, and other radiation sources. An example of a mechanism that can generate and apply curing radiation in a card personalization system is the radiation applicator used in the DATACARD® MX8100™ Card Issuance System available from Entrust Corporation of Shakopee, Minnesota The one or more additional document processing stations 20 can be stations that are configured to perform any type of additional document processing. Examples of the additional document processing stations 20 include, but are not limited to, an embossing station having an embosser configured to emboss characters on the documents, an indent station having an indenter configured to indent one or more characters on the documents, a lamination station with a laminator configured to apply one or more laminates to the documents, a security station with a security feature applicator configured to apply one or more additional security features to one or more of the surfaces of the documents, and one or more document reorienting mechanisms/flippers configured to rotate or flip a document 180 degrees for processing on both sides of the documents.

The document output 22 can be configured to hold a plurality of documents after they have been processed. In this configuration, the document output 22 is often termed a document output hopper. The construction and operation of output hoppers is well known in the art. In another embodiment, the document output 22 can be an output slot.

FIG. 2 is a schematic depiction of another embodiment of a document processing system 30 that can be used to process plastic cards (or passports). In this embodiment, the card processing system 30 can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SIGMA™ and ARTISTA™ family of desktop card printers available from Entrust Corporation of Shakopee, Minnesota. Other examples of desktop processing machines are disclosed in U.S. Pat. Nos. 7,434,728 and 7,398,972, each of which is incorporated herein by reference in its entirety.

In FIG. 2, elements in the system 30 that are similar in construction or functionality to elements in the system 10 in FIG. 1 are referred to using the same reference numerals. In FIG. 2, the system 30 is illustrated as including the document input 12 and the document output 22 at one end of the system 30. In the type of system depicted in FIG. 2, the document input 12 and/or the document output 22 can be provided at other locations in the system 30. For example, in one embodiment, the document input 12 can be located at a position higher up in the system, for example at the top of the system above the transport path X between the ends of the system 30. In another embodiment as depicted in dashed lines in FIG. 2, the document input 12 and the document output 22 can be located at the opposite end of the system 30.

The one or more optional document processing stations 14, the print station 16, and the curing station 18 can be arranged relative to one another in the manner indicated in FIG. 2 and as described above for FIG. 1. In an embodiment, a card flipper 32 can be provided at the end of the system 30 that is configured to flip or rotate the card 180 degrees so that the card surface previously facing upward is now facing downward, and the card surface previously facing downward is now facing upward. The card is then transported in reverse back toward the curing station 18, the print station 16 and the other processing stations for additional processing on the now upwardly facing card surface and ultimately transported to the output 22. If the card flipper 32 is not present, the card can simply be reversed in direction after curing in the curing station 18 is finished, and the card ultimately transported to the output 22.

In the systems 10, 30 in FIGS. 1 and 2, the documents can be transported throughout the systems 10, 30 and moved along the document transport path X by one or more suitable mechanical document transport mechanisms (not shown). Mechanical document transport mechanism(s) for transporting cards and passports in document processing equipment of the type described herein are well known in the art. Examples of mechanical document transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of document transport mechanisms that could be used, as well as the construction and operation of such document transport mechanisms.

Figure 3A:
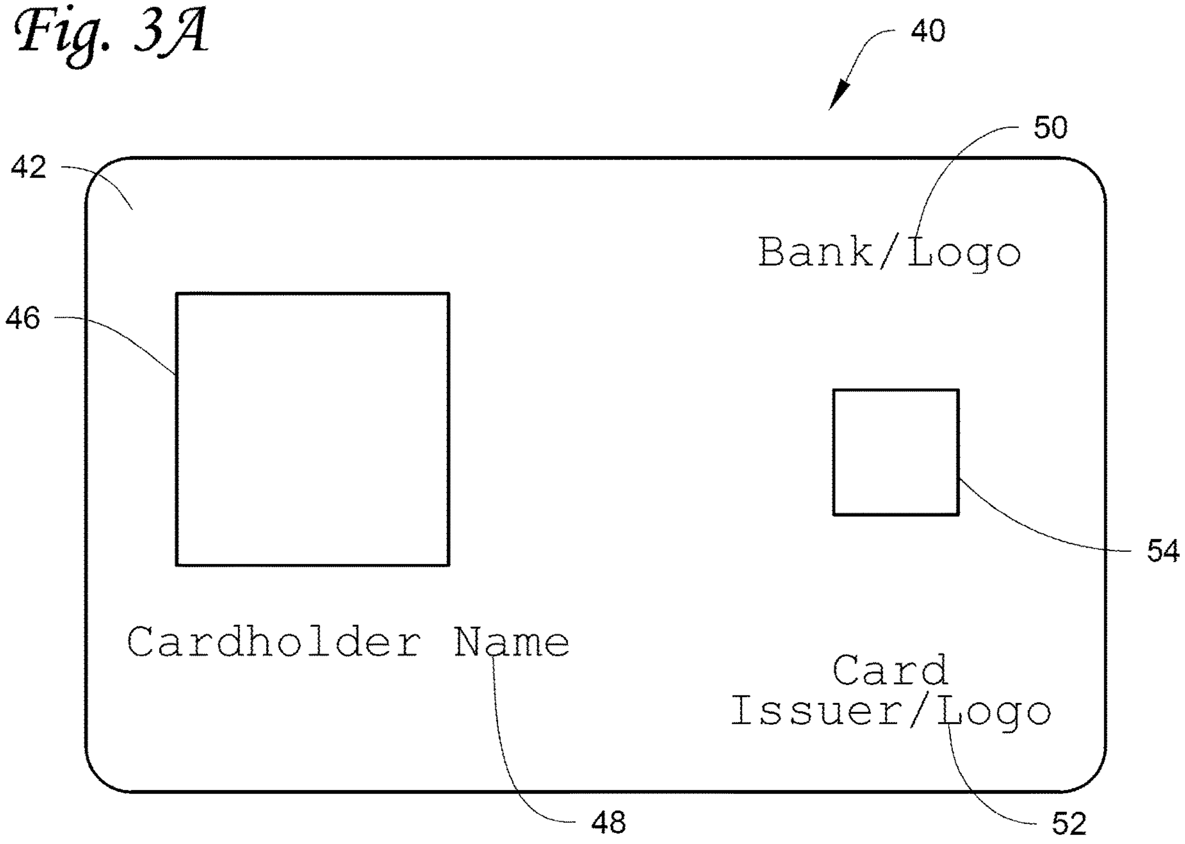
FIG. 3A is a view of an example of a front surface of a personalized plastic document in the form of a plastic card.
Figure 3B:
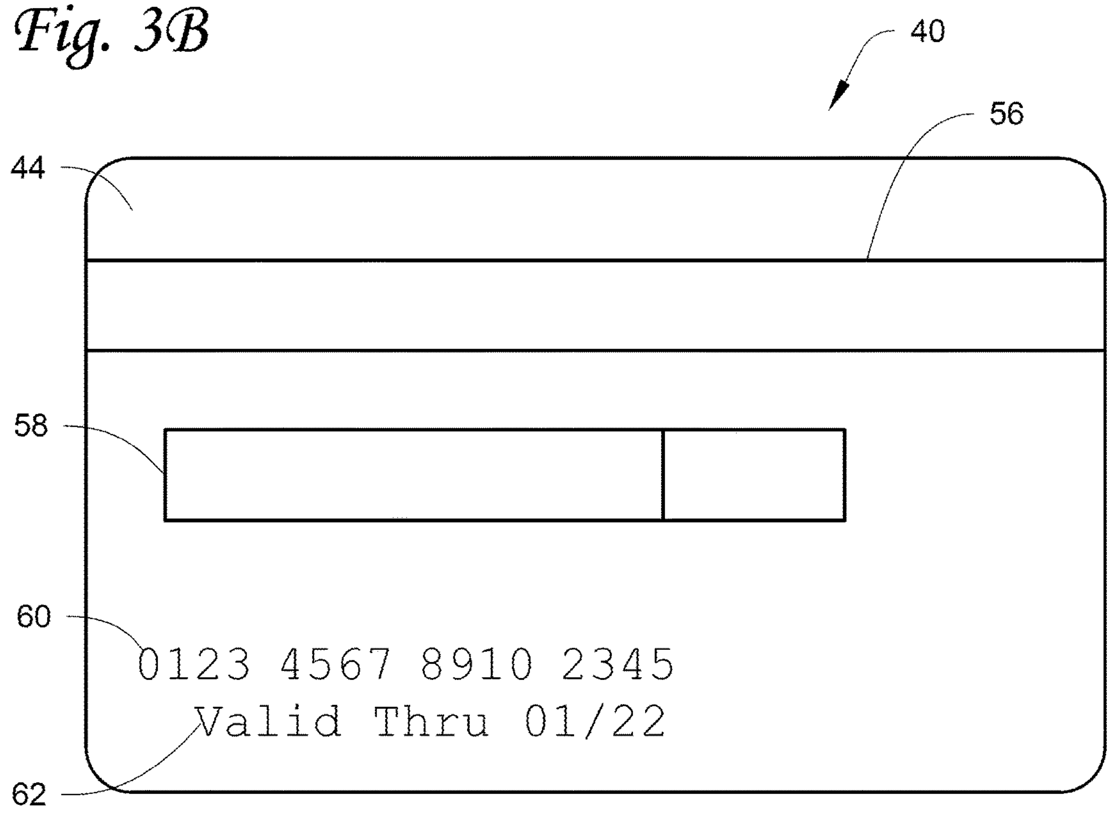
FIG. 3B is a view of an example of a rear surface of a personalized plastic document in the form of a plastic card.

FIGS. 3A and 3B illustrate an example of a plastic card 40. In this example, the card 40 is shown to include a front or first surface 42 (FIG. 3A) and a rear, back or second surface 44 (FIG. 3B) opposite the front surface 42. The card 40 may be printed on one side only (referred to as simplex printing), for example on the front surface 42 or the rear surface 44, or printed on both sides (referred to as duplex printing), for example on each of the front surface 42 and the rear surface 44.

Many possible layouts for the front surface 42 are possible. For example, the front surface 42 can include a horizontal card layout, a vertical card layout, and other known layout configurations and orientations. In the illustrated example in FIG. 3A, the front surface 42 can include various printed cardholder data such as a printed portrait image 46, the cardholder name 48, and account information such as account number, expiration date and the like. The front surface 42 can also include other printed data such as printed information 50 of the entity that issued the card 40, such as the corporate name and/or logo of the issuing bank (for example, STATE BANK), and/or printed information 52 of the card brand name (for example, VISA®, MASTERCARD®, DISCOVER®, etc.). The front surface 42 may also include a contact or contactless integrated circuit chip 54 that can store various data relating to the card 40 such as an account number and/or name of the cardholder.

Referring to FIG. 3B, many possible layouts for the rear surface 44 are possible which may or may not have a similar layout as the front surface 18. For example, the rear surface 44 can include a horizontal card layout, a vertical card layout, and other known layout configurations and orientations. In the illustrated example in FIG. 3B, the rear surface 44 can include a magnetic strip 56 that stores various data relating to the card 40 such as an account number or name of the cardholder, a signature panel 58 that provides a place for the cardholder to sign their name, and a hologram. The magnetic strip 56, the signature panel 58, and the hologram are conventional elements found on many plastic cards. The rear surface 44 can also include printed personal data that is unique to or assigned specifically to the cardholder. For example, an account number 60 assigned to the cardholder, the name of the cardholder, and a card expiration date 62 can be printed on the rear surface 44. Other personal cardholder data may also be printed on the rear surface 44, such as an image of the face of the cardholder. Non-personal data such as the name of the issuing bank, contact information to contact the issuing bank, and the like, can also be printed on the rear surface 44.

Some or all of the printing on the front surface 42 and/or the printing on the rear surface 44 is at least partially overlapped or completely overlapped by a radiation curable material that is applied in the print station 16 from the print ribbon along with the color material forming the printing. Once the radiation curable material is cured, the durability (for example, abrasion resistance, chemical resistance, and adhesion) of the printing compared to the durability of printing that is not overlapped by radiation cured material is increased or enhanced. The enhanced durability is sufficient to permit the plastic card 40 to be issued to the cardholder without a protective laminate or coating applied over the entire front surface 42 and/or over the entire rear surface 44. In other words, the front surface 42 and/or the rear surface 44 can be without or devoid of a protective laminate or coating overlaying the entire front surface 42 and/or overlaying the entire rear surface 44. However, in an embodiment, a protective laminate or coating can be applied to overlay the entire front surface 18 and/or the entire rear surface 20.

Figure 4:
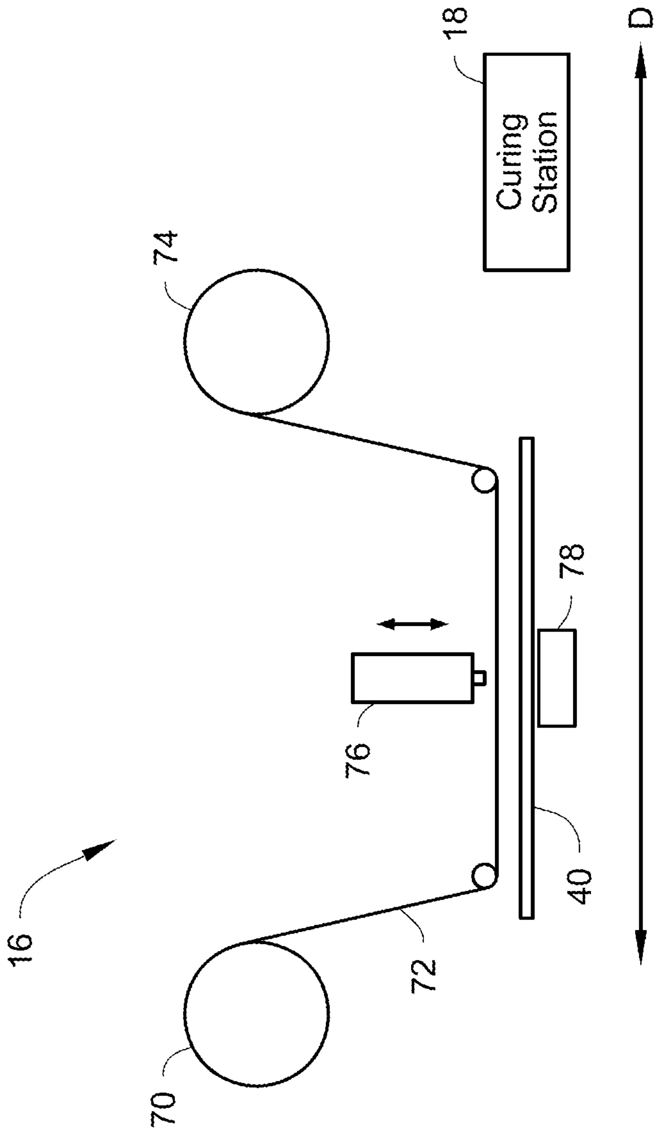
FIG. 4 depicts an example of a print station of the personalized document processing system.
Figure 5:
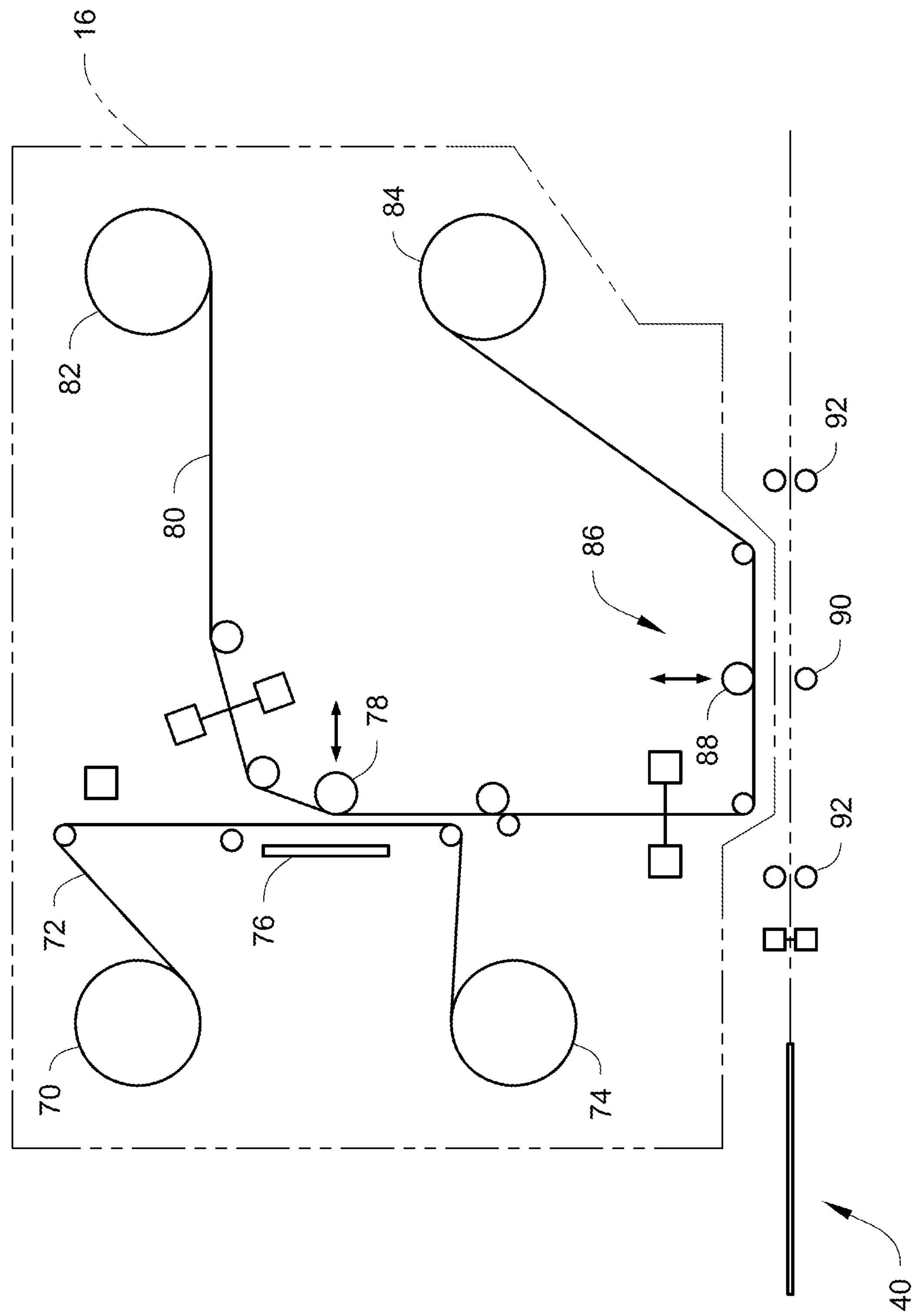
FIG. 5 depicts another example of a print station of the personalized document processing system.

FIGS. 4 and 5 illustrate examples of the print station 16 that can be used in the systems 10, 30 of FIGS. 1 and 2. Referring to FIG. 4, the print station 16 is configured as a direct-to-card thermal transfer printer with a ribbon supply 70 that supplies a thermal transfer print ribbon 72, and a ribbon take-up 74 that takes-up used portions of the thermal transfer print ribbon 72 after printing. The print ribbon 72 is transferred along a ribbon path between the ribbon supply 70 and the ribbon take-up 74 past a thermal print head 76 that can be moved toward and away from an opposing fixed platen 78 to sandwich the print ribbon 72 and the card 40 therebetween during printing. Alternatively, the platen 78 can be movable toward and away from the print head 76 which can be stationary. The card 40 can be transported in both forward and reverse directions along the transport direction D through the print station 16 using conventional card transport mechanisms such as transport rollers. The general construction and operation of thermal transfer print stations is well known in the art. The curing station 18 is depicted as being downstream from the print station 16 so that after printing, the card 40 is transported to the curing station 18 for curing. In another embodiment, the curing station 18 can be located upstream of the print station 16, or the curing station 18 can be incorporated into and can be considered part of the print station 16. In another embodiment, in the case of a desktop card processing machine, the curing station 18 can be a modular unit that is attached to the desktop card processing machine, for example to an end thereof, as an add-on or upgrade mechanism.

Referring to FIG. 5, the print station 16 is configured as a retransfer printer that performs retransfer printing on the plastic card 40. Retransfer printing and the general construction of retransfer card printers is well known in the art. In this example, elements that are the same as or similar to elements in the print station 16 in FIG. 5 are referenced using the same reference numerals. The print station 16 in FIG. 5 includes the print ribbon supply 70, the print ribbon 72, the print ribbon take-up 74, the thermal print head 76, and the platen 78.

In the print station 16 of FIG. 2, instead of printing directly on the plastic card 40, the printing is initially performed on a transferrable material of a retransfer ribbon 80. The retransfer ribbon 80 includes at least a carrier film with the transferrable material (also referred to as a print receptive layer) thereon. The retransfer ribbon 80 is supplied from a retransfer ribbon supply 82 and used retransfer ribbon is wound up on retransfer ribbon take-up 84. The retransfer ribbon 80 follows a path past the print head 76 where printing takes place on the transferrable material of the retransfer ribbon 80. The retransfer ribbon 80 with the printing thereon is then advanced to a transfer station 86 where the transferrable material with the printing thereon is transferred from the retransfer ribbon 80 and laminated onto the card 40 using a heated transfer roller 88 and a platen 90. After transferring the transferrable material with the printing, the used retransfer ribbon 80 is wound onto the take-up 84. The card can be transported within the print station 16 using transport rollers 92 or other transport mechanisms.

The thermal transfer print ribbon 72 (or just print ribbon 72) that is used with the print stations 16 in FIGS. 4 and 5 includes a repeating sequence of panels of thermally transferrable material, each sequence of panels includes at least one panel of thermally transferrable color material, which may be dye-based ink or pigment ink, for forming the printing on the plastic card 40, followed by at least one panel of thermally transferrable radiation curable protective topcoat material. The print ribbon 72 may be referred to as a panelized print ribbon. In an embodiment, the thermally transferrable color material may also be radiation curable.

Figure 6:
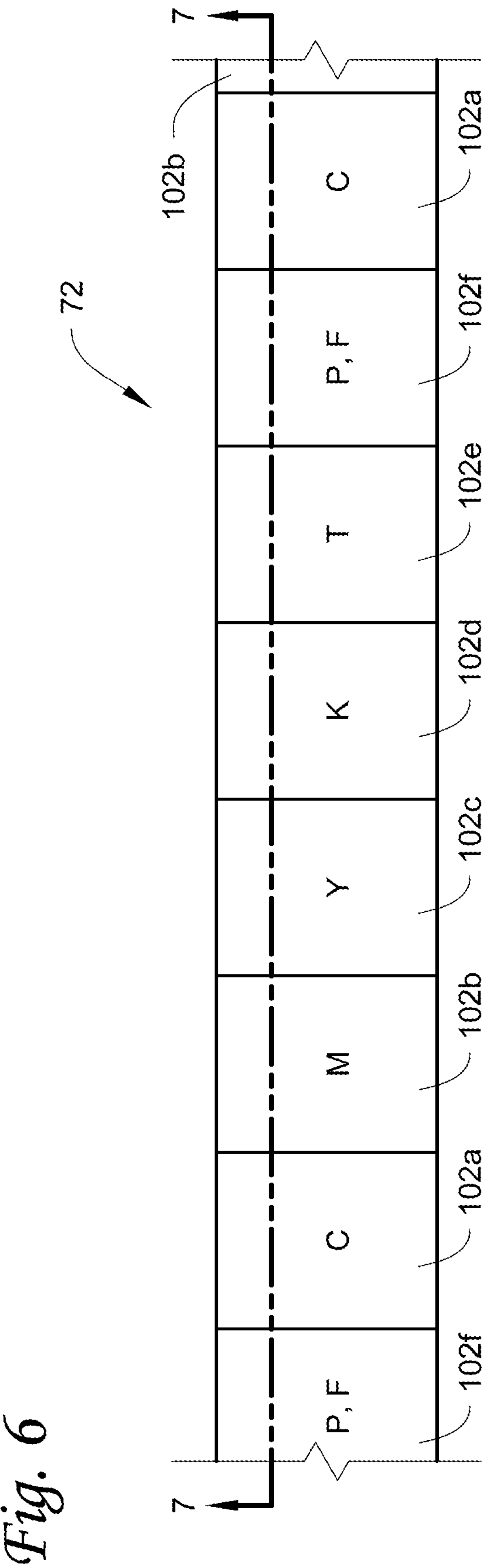
FIG. 6 is a top view of a portion of a print ribbon that can be used in the print stations of FIGS. 4 and 5.
Figure 7:
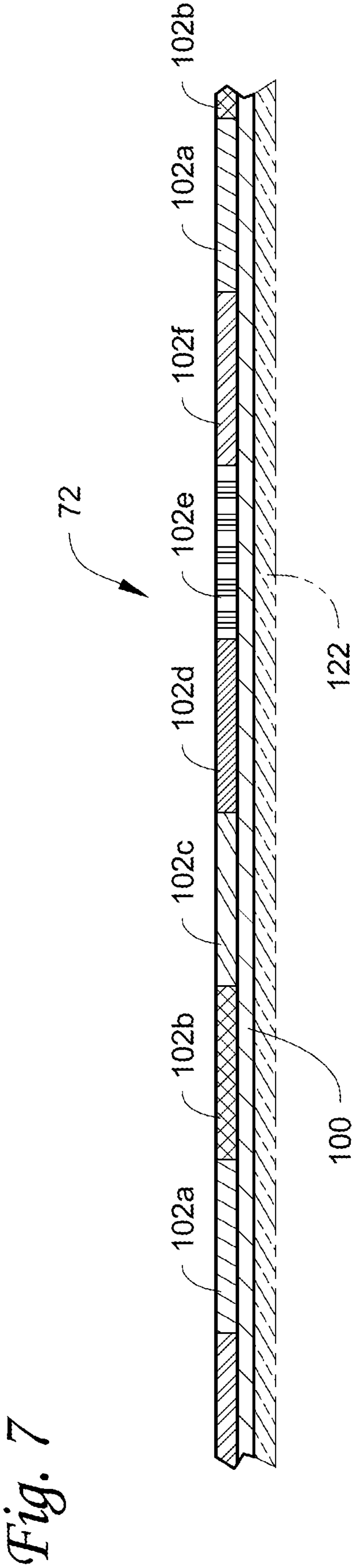
FIG. 7 is a cross-sectional view taken along line 7-7 of FIG. 6.

Referring to FIGS. 6 and 7, a specific example of the thermal transfer print ribbon 72 that can be used with the print stations 16 in FIGS. 4 and 5 is illustrated. The ribbon 72 includes a carrier film 100 (FIG. 7), and a repeating sequence of panels of thermally transferrable material with each sequence of panels including a cyan (C) color panel 102*a*, a magenta (M) color panel 102*b*, a yellow (Y) color panel 102*c*, and a black (K) color panel 102*d*. The material forming the color panels can be pigment ink, dye-based ink, or other colorant material. Each sequence of panels further includes at least one panel of thermally transferrable radiation curable protective topcoat material (T) 102*e*. Each sequence of panels can optionally include a panel(s) 102*f* of primer (P) material and/or a panel of fluorescent (F) material, and/or a panel of optically variable material, and other panels. If a P panel and/or an F panel are provided, they would be provided as separate panels in each sequence of panels.

In the example of FIGS. 6 and 7, the print ribbon 72 is used to form printing on a surface of the plastic card. For example, the CMY panels 102*a-c* can be used to form the printed portrait image 46 (FIG. 3A) of the intended cardholder, while the K panel 102*d* can be used to print other cardholder data such as the cardholder name 48 (FIG. 3A). The T-panel 102*e* is then used to apply the radiation curable topcoat material over at least some of the printed data. For example, the radiation curable topcoat material from the T-panel 102*e* can be applied over a portion of or the entire portrait image 46 and/or the radiation curable topcoat material from the T-panel 102*e* can be applied over a portion of or the entirety of the cardholder name 48, the account number 60, and the like. The radiation curable topcoat material from the T-panel 102*e* can be applied over select ones of the printed data on the card, or the radiation curable topcoat material from the T-panel 102*e* can be applied over the entire card surface including all of the printed data on the card surface.

Figure 8:
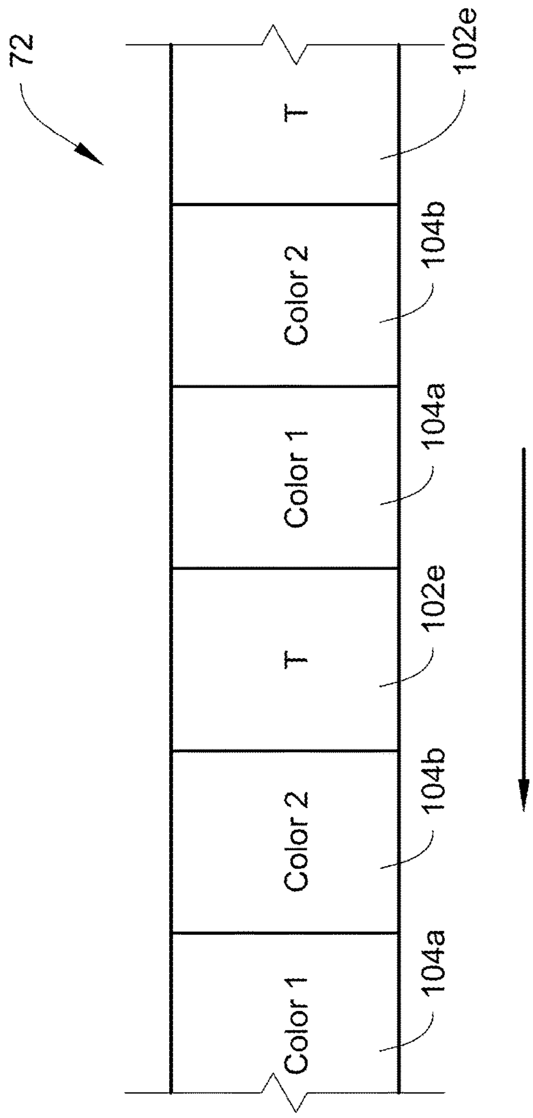
FIG. 8 is a top view of a portion of another embodiment of a print ribbon that can be used in the print stations of FIGS. 4 and 5.

FIG. 8 illustrates another example of the thermal transfer print ribbon 72 that can be used with the print stations 16 in FIGS. 4 and 5. In this example, the print ribbon 72 includes a carrier film (not shown) similar to the carrier film 100 in FIG. 7, and a repeating sequence of panels of thermally transferrable material with each sequence of panels including two panels 104*a*, 104*b* of color material, and the at least one panel of thermally transferrable radiation curable protective topcoat material (T) 102*e*. Each sequence of panels can also optionally include the panel(s) of primer (P) material, optically variable material, and/or fluorescent (F) material, and other panels as described above with respect to FIGS. 6-7.

The panels 104*a*, 104*b* of color material can be any two color materials that one may want to apply to the plastic card. For example, the panels 104*a*, 104*b* can be two or more of black, silver, white, gray, cyan (C), magenta (M), or yellow (Y) in any order.

Figure 9:
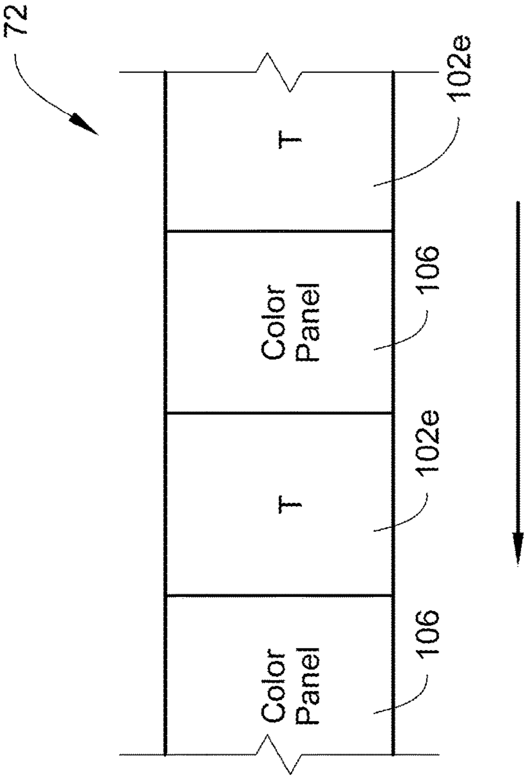
FIG. 9 is a top view of a portion of another embodiment of a print ribbon that can be used in the print stations of FIGS. 4 and 5.

FIG. 9 illustrates another example of the thermal transfer print ribbon 72 that can be used with the print stations 16 in FIGS. 4 and 5. In this example, the print ribbon 72 includes a carrier film (not shown) similar to the carrier film 100 in FIG. 7, and a repeating sequence of panels of thermally transferrable material with each sequence of panels including one panel 106 of color material, and the at least one panel of thermally transferrable radiation curable protective topcoat material (T) 102*e*. Each sequence of panels can also optionally include the panel(s) of primer (P) material and/or fluorescent (F) material and/or optically variable material, and other panels as described above with respect to FIGS. 6-7. The panel 106 of color material can be any color material that one may want to apply to the plastic card. For example, the panel 106 can be black, silver, white, gray, cyan (C), magenta (M), or yellow (Y).

The radiation curable topcoat material of the T-panels 102*e* in FIGS. 6-9 is dry or substantially dry. The term dry means that the material of the T-panels 102*e* are not tacky at room temperature allowing the print ribbon 72 to be wound upon itself without using a removable interleaf overlaying the panels 102*e* to prevent sticking of the panels to themselves or to the carrier film 100 when wound into a roll. The T-panels 102*e* may also be referred to as being non-blocking. In one non-limiting embodiment, the radiation curable topcoat material of the T-panels 102*e* can be applied to the plastic card with a thickness of between about 3 microns to about 8 microns.

The radiation curable topcoat material may also be described as being print receptive. Print receptive means that the radiation curable topcoat material is suitable for receiving color material from a print ribbon (or from a drop-on-demand print head) to form printing on the radiation curable topcoat material where the resulting print quality on the radiation curable topcoat material is considered sufficient to allow the resulting plastic card to be issued to the intended cardholder. A typical topcoat material used with plastic cards and other personalized identification documents is not printed on and is not considered in the plastic card industry to be print receptive. However, the radiation curable topcoat material described herein is print receptive and could be printed on if one chooses to do so.

In one non-limiting embodiment, the thermal transfer print ribbon 72 can have the following construction. However, other constructions are possible.

Example Print Ribbon Construction

Carrier Film 100:

Materials for the carrier film 100 can include, but are not limited to, polyester, polycarbonate, polyolefin, polyurethane, acetate, and others, individually and in combinations thereof. It is desirable that the carrier film 100 has sufficient heat and dimensional stability during the coating, drying, printing and transfer process. In one embodiment, the carrier film 100 can have a thickness of between about 4.0 microns to about 8.0 microns. In another embodiment, the carrier film 100 can have a thickness of between about 4.0 microns to about 6.0 microns.

Color Panels:

The construction and formulation of the color panels, which may be dye-based inks and/or pigment inks, can be standard and known in the art.

T-Panels 102*e*:

The material of the T-panels 102*e* can include, but is not limited to, a mixture of: (i) one or more UV or other radiation curable acrylates, urethane acrylates, epoxy acrylates, or acrylate oligomers, individually and in combinations thereof; (ii) one or more thermoplastic vinyls, acrylics, acetates, urethanes, or polyesters, individually and in combinations thereof; and (iii) one or more photoinitiators. Optionally, other additives can be included such as surfactants, wax, stabilizers, inhibitors, and others to improve processing and stability of the T-panels 102*e* of the print ribbon 72. Optionally, fillers like silica, aluminum oxide and others may be added to improve toughness. Each resulting T-panel 102*e* is dry to the touch or substantially dry to the touch.

A solution of these components is made in a suitable solvent system and coated over the carrier film 100 with conventional coating methods like gravure, wire wound rod or slot die coating. When dried after coating, the layer of material forming each T-panel 102*e* should be tack-free or dry to the touch or substantially dry to the touch. This dry to the touch layer is radiation cured after it has been transferred to the desired substrate like the plastic card or the retransfer ribbon.

In one embodiment, each T-panel 102*e* can have a thickness of between about 3.0 microns to about 12.0 microns. In another embodiment, each T-panel 102*e* can have a thickness of between about 5.0 microns to about 10.0 microns.

In an embodiment, each T-panel 102*e* can comprise at least the following components: one or more radiation curable monomers preferably tetrafunctional or greater; one or more photoinitiators; one or more non-functional polymers; one or more radiation-curable acrylic polymers; one or more heat-curable monomers; one or more hydroxy-functional polymers; one or more thermal initiators; and one or more silica sols.

The one or more radiation curable monomers, commonly an acrylic monomer, can comprise an average functionality of four or larger, or a majority of the at least one radiation curable monomer has an average functionality of four or larger. The radiation curable monomer may comprise an acrylic monomer, such as, for example, an aliphatic urethane hexaacrylate, or an acrylic monomer with hydroxyl functionality, such as, for example, dipentaerythritolhexaacrylate (DPHA).

The one or more photoinitiators absorb radiation in the actinic wave band from 220 nm to 410 nm that is generated by conventional mercury UV lamps, or absorb radiation at longer select actinic wavelengths, typically 395 nm, 385 nm and 365 nm, that are emitted by LED lamps. An example of a photoinitiator that can be used includes, but is no limited to, bis-acylphosphineoxide (BAPO).

Examples of non-functional polymers that can be used include, but are not limited to, polyester, vinyl copolymers and polyacrylic polymers, alone or in combination. These components aid in overall film formation and adhesive properties of thermally-transferrable radiation-curable topcoats.

The one or more radiation-curable acrylic polymers can include, but are not limited to, one or more UV-curable acrylic polymers which exist in solid-phase at room temperature and can be prepared using a two-step reaction: (1) preparing acrylic polymers that have pendant isocyanate functionality using 2-methacryloyloxyethyl isocyanate (MOI) as a co-monomer; and then (2) reacting the pendant isocyanate groups with hydroxy-functional epoxide, oxetane, or benzophenone.

The one or more hydroxy-functional polymers are polymers comprising hydroxyl groups that are capable of reacting with reactive groups on heat curable monomers, such as, for example, ether groups, to form covalent bonds. Examples of hydroxy-functional polymers that can be used include, but are not limited to, polyacrylic polyols, cellulose ester polyols, polyether polyols, polyester polyols and polyvinyl alcohols.

The one or more heat-curable monomers that can be used can include, but are not limited to, isocyanates, epoxies, phenolics, amines, silanes, and monomers with one or more ether groups such as, one, two, three, or more ether groups. The ether groups may, for example, include one or more methoxy, ethoxy, or other groups. The ether groups may react with other functional groups, such as, for example, hydroxyl groups, or they may react with other ether groups. The reactions may result in polymerization or cross-linking. Heat-curable monomers with aromatic or heteroaromatic rings, such as, for example, functionalized melamine monomers, may provide improved coating compatibility with substrates such as polyethylene terephthalate. An example of a heat-curable monomer that can be used includes, but is not limited to, hexamethoxymethylmelamine (HMMM).

The one or more thermal initiators promote polymerization and cross-linking reactions. Thermal initiators accomplish this function by lowering the activation energy (Ea) for a given step reaction, providing a different route. The different route allows bond rearrangements to convert reactants to products more easily, with a lower energy input. In a given time interval, the presence of a thermal initiator allows a greater proportion of the reactant species to pick up sufficient energy to pass through the transition state and become products. An example of a thermal initiator that can be used includes, but is not limited to, is para-toluene sulfonic acid (PTSA).

The one or more silica sols impart hardness and heat resistance to the thermally-transferrable radiation-curable topcoat. An example of a silica sol that can be used includes, but is not limited to, a colloidal silica sol that allows for high transparency under visible light when dispersed evenly in liquid media.

The thermally-transferrable radiation-curable topcoat may also include one or more organic solvents used for purposes such as controlling solution viscosity, improving wetting and substrate coating. Examples of organic solvents that can be used include, but are not limited to, ketones, esters, and alcohols, such as, for example, methyl ethyl ketone, butyl acetate and isopropanol.

Natural or synthetic waxes may be added to the topcoat to increase surface slip.

The topcoat may also include one or more reactive silanes as a coupling agent for silica sols and heat-curable monomer to improve tensile properties.

Optional Release Layer:

An optional release layer can be provided between each T-panel 102*e* and the carrier film 100 to facilitate the release of the radiation curable material of the T-panels 102*e* from the carrier film 100. The optional release layer can include, but is not limited to, a polyester, an acrylic or a wax based coating that can be applied with conventional coating methods like gravure, wire wound rod or slot die coating. The optional release layer may be thermoplastic or cured with heat or radiation.

In one embodiment, the optional release layer may have a thickness of between about 0.1 microns to about 4.0 microns. In another embodiment, the optional release layer may have a thickness of about 0.1 microns to about 2.0 microns.

In one embodiment, the optional release layer may include one or more of a thermally-cured melamine such as an amino cross-linker; a thermally-cured silicone; and a UV-cured silicone.

The thermally-cured amino-cross linked release system can contain at least the following: one or more heat-curable amino resin monomers; one or more hydroxy-functional polymers; and one or more thermal initiators. The one or more heat curable amino resin monomers may include monomers with one or more ether groups such as, one, two, three, or more ether groups. The ether groups may, for example, include one or more methoxy, ethoxy, or other groups. The ether groups may react with other functional groups such as, for example, hydroxyl groups, or they may react with other ether groups. The reactions may result in polymerization or cross-linking. Heat-curable monomers with aromatic or heteroaromatic rings, such as, for example, functionalized melamine monomers, may provide improved coating compatibility with substrates such as polyethylene terephthalate. An example of a thermally-cured monomer that can be used is hexamethoxymethylmelamine (HMMM). Hydroxy-functional polymers are polymers comprising hydroxyl groups that are capable of reacting with reactive groups on heat curable monomers, such as, for example, ether groups, to form covalent bonds. Hydroxy-functional polymers may be characterized by their hydroxyl content. Examples of hydroxy-functional polymers that can be used include, but are not limited to, polyacrylic polyols, cellulose ester polyols, polyether polyols, polyester polyols and polyvinyl alcohols. Thermal initiators promote polymerization and cross-linking reactions. Thermal initiators accomplish this function by lowering the activation energy (Ea) for a given step reaction, providing a different route. The different route allows bond rearrangements to convert reactants to products more easily, with a lower energy input. In a given time interval, the presence of a thermal initiator allows a greater proportion of the reactant species to pick up sufficient energy to pass through the transition state and become products. An exemplary thermal initiator is para-toluene sulfonic acid (PTSA). The thermally-cured amino-cross-linked release coating may also include organic solvents which control solution viscosity, improve wetting and substrate coating. Examples of organic solvents that can be used include, but are not limited to, ketones, esters, and alcohols, such as, for example, methyl ethyl ketone, butyl acetate and isopropanol. Surfactants may be added to the release coating to improve wetting of the release coating. Hydroxyl-functional polysiloxanes are exemplary wetting agents for heat-cured coatings because they will form covalent bonds with heat-cured monomers during the drying process at elevated temperatures, resisting migration of surfactant molecules to the backside of the carrier film in roll form under long-term storage conditions.

The thermally-cured silicone can comprise at least the following components: one or more silicone polymers with vinyl groups; one or more silicone hydride crosslinkers; and one or more thermal initiators, preferably a platinum catalyst. Vinyl-functional polysiloxanes undergo thermally-induced addition polymerization upon exposure to elevated temperatures in the presence of a platinum catalyst. Thermally-cured silicone polymers fall under four general categories: 1) silicone polymers with terminal vinyl functionality (at chain ends), 2) silicone polymers with pendent vinyl functionality (at side of polymer backbone), 3) silicone polymers varying in chain length, and 4) silicone hydride crosslinker type. The ratio of various silicone polymers with vinyl or methylhydrogen groups over these four general categories dictates the relative ratio of vinyl groups to silicone groups in the thermally-cured silicone release layer. It is this ratio that largely determines the thermally-cured release composite ultimate performance properties (i.e: snug release to easy release). Thermal initiators promote polymerization and cross-linking reactions. Thermal initiators accomplish this function by lowering the activation energy (Ea) for a given step reaction, providing a different route. The different route allows bond rearrangements to convert reactants to products more easily, with a lower energy input. In a given time interval, the presence of a thermal initiator allows a greater proportion of the reactant species to pick up sufficient energy to pass through the transition state and become products. An example of a thermal initiator that can be used is Karstedt's catalyst $Pt_2[(Me_2SiCH{=}CH_2)_2O]_3$. The thermally-cured silicone release coating may also include organic solvents used to control solution viscosity, improve wetting and substrate coating. Examples of organic solvents that can be used include, but are not limited to, ketones, esters, and alcohols, such as, for example, methyl ethyl ketone, butyl acetate and isopropanol. Further, petroleum solvents such as n-heptane, isooctane and VM&P Naphtha may be used as diluents in the thermally-curable silicone release coating.

The UV-cured silicone release coating may comprise at least the following components: one or more silicone polymers with acrylate or epoxy groups, present as a blend; one or more radiation curable monomers preferably tetrafunctional or greater; and one or more photoinitiators. Acrylate-functional polysiloxanes undergo free-radically-induced polymerization upon exposure to UV light in the presence of a photoinitiator. Epoxy-functional polysiloxanes undergo cationically-induced polymerization upon exposure to UV light in the presence of a cationic photoinitiator. Both silicone acrylate and silicone epoxy polymer units fall under three general categories: 1) silicone polymers with terminal acrylate or epoxy functionality (at chain ends), 2) silicone polymers with pendent acrylate or pendent epoxy functionality (at side of polymer backbone), and 3) silicone acrylate or silicone epoxy polymers varying in chain length. The ratio of silicone acrylate or silicone epoxy polymers over these three general categories dictates the relative ratio of acrylate or epoxy groups to silicone groups in the UV-cured silicone release layer.

The one or more radiation curable monomers can comprise an average functionality of four or larger, or a majority of one or more radiation curable monomers has an average functionality of four or larger. In at least some embodiments, the radiation curable monomer may comprise an acrylic monomer, such as, for example, an aliphatic urethane hexaacrylate, or an acrylic monomer with hydroxyl functionality, such as, for example, dipentaerythritolhexaacrylate (DPHA). Photoinitiators used for the UV-cured silicone release coating absorbs radiation in the actinic wave band from 220 nm to 410 nm that is generated by conventional mercury UV lamps, or absorb at longer select actinic wavelengths, typically 395 nm, 385 nm and 365 nm, that are emitted by LED lamps. An example of a UV photoinitiator for both conventional UV-cure and UV-LED cure that can be used is bis-acylphosphineoxide (B APO). Cationic photoinitiators are strong acid generators derived from sulfonium or iodonium salts comprised of a cationic and anionic pair. An example of a cationic photoinitiator that can be used is triarylsulfonium hexafluoroantimonate salt. The UV-curable silicone release coating may also include organic solvents used for controlling solution viscosity, improve wetting and substrate coating. Examples of organic solvents that can be used include, but are not limited to, ketones, esters, and alcohols, such as, for example, methyl ethyl ketone, butyl acetate and isopropanol. Further, petroleum solvents such as n-heptane, isooctane and VM&P Naphtha may be used as diluents in the UV-cured silicone release coating.

Optional Adhesive Layer:

An optional adhesive layer can be added over each T-panel 102*e* to enhance the adhesion of the radiation curable material to the substrate such as the plastic card or a retransfer ribbon. The optional adhesive layer can be made of a single resin or a mixture of acrylates, polyurethanes, polyesters, vinyls, acetates or epoxies. The optional adhesive layer can be coated with conventional coating methods like gravure, wire wound rod or slot die coating. The optional adhesive layer may be thermoplastic or cured with heat or radiation.

In one embodiment, the optional adhesive layer may have a thickness of between about 1.0 microns to about 5.0 microns. In another embodiment, the optional adhesive layer may have a thickness of between about 1.0 microns to about 3.0 microns.

The print ribbon 72 may also optionally include a backcoat 122 (depicted in broken lines in FIG. 7). The backcoat 122 may also be referred to as a backcoat layer. The backcoat 122 prevents the topcoat 102*e* and/or the material of the other panels 102*a-d* from sticking to the carrier film 100 when the print ribbon 72 is wound into a roll form. The backcoat 122 also provides sufficient slip property and heat stability between the print head and the print ribbon during the printing process. The backcoat 122 can have any formulation that is suitable to achieve these properties. The backcoat 122 can be formed from a radiation cured material(s) or thermally cured material(s). In an embodiment, the backcoat 122 can comprise a thermally-cured melamine; a thermally-cured silicone; or a UV-cured silicone.

The thermally-cured melamine can comprise a thermally-cured amino-crosslinked backcoat with at least the following components: one or more heat-curable amino resin monomers; and one or more hydroxy-functional polymers; and one or more thermal initiators. The one or more heat curable amino resin monomers may include, but are not limited to, monomers with one or more ether groups such as, one, two, three, or more ether groups. The ether groups may, for example, include one or more methoxy, ethoxy, or other groups. The ether groups may react with other functional groups such as, for example, hydroxyl groups, or they may react with other ether groups. The reactions may result in polymerization or cross-linking. Heat-curable monomers with aromatic or heteroaromatic rings, such as, for example, functionalized melamine monomers, may provide improved coating compatibility with such substrates as polyethylene terephthalate. An example of a heat-curable monomer that can be used is hexamethoxymethylmelamine (HMMM). The one or more hydroxy-functional polymers are polymers comprising hydroxyl groups that are capable of reacting with reactive groups on heat curable monomers, such as, for example, ether groups, to form covalent bonds. Examples of hydroxy-functional polymers that can be used include, but are not limited to, polyacrylic polyols, cellulose ester polyols, polyether polyols, polyester polyols and polyvinyl alcohols. The one or more thermal initiators promote polymerization and cross-linking reactions. Thermal initiators accomplish this function by lowering the activation energy (Ea) for a given step reaction, providing a different route. The different route allows bond rearrangements to convert reactants to products more easily, with a lower energy input. In a given time interval, the presence of a thermal initiator allows a greater proportion of the reactant species to pick up sufficient energy to pass through the transition state and become products. An example of a thermal initiator that can be used includes, but is not limited to, para-toluene sulfonic acid (PTSA). The thermally-cured amino-crosslinked backcoat may also include organic solvents used for purposes such as controlling solution viscosity, improving wetting and substrate coating. Examples of organic solvents that can be used include, but are not limited to, ketones, esters, and alcohols, such as, for example, methyl ethyl ketone, butyl acetate and isopropanol. Surfactants may be added to the backcoat to improve wetting of backcoat coatings. Hydroxyl-functional polysiloxanes are exemplary wetting agents for heat-cured coatings because they will form covalent bonds with heat-cured monomers during the drying process at elevated temperatures, resisting migration of surfactant molecules to the coating on the front face of the carrier film in roll form under long-term storage conditions.

The thermally-cured silicone backcoat can comprise at least the following: one or more silicone polymers with vinyl groups; one or more silicone hydride crosslinkers; and one or more thermal initiators, preferably a platinum catalyst. Vinyl-functional polysiloxanes undergo thermally-induced addition polymerization upon exposure to elevated temperatures in the presence of a platinum catalyst. Thermally-cured silicone polymer units fall under four general categories: 1) silicone polymers with terminal vinyl functionality (at chain ends), 2) silicone polymers with pendent vinyl functionality (at side of polymer backbone), 3) silicone polymers varying in chain length, and 4) silicone hydride crosslinker type. The ratio of various silicone polymers with vinyl or methylhydrogen groups over these four general categories dictates the relative ratio of vinyl groups to silicone groups in the thermally-cured silicone backcoat. Thermal initiators promote polymerization and cross-linking reactions. Thermal initiators accomplish this function by lowering the activation energy (Ea) for a given step reaction, providing a different route. The different route allows bond rearrangements to convert reactants to products more easily, with a lower energy input. In a given time interval, the presence of a thermal initiator allows a greater proportion of the reactant species to pick up sufficient energy to pass through the transition state and become products. An example of a thermal initiator that can be used is Karstedt's catalyst $Pt_2[(Me_2SiCH{=}CH_2)_2O]_3$. The thermally-cured silicone backcoat may also include organic solvents used for such purposes as controlling solution viscosity, improving wetting and substrate coating. Examples of organic solvents that can be used include, but are not limited to, ketones, esters, and alcohols, such as, for example, methyl ethyl ketone, butyl acetate and isopropanol. Further, petroleum solvents such as n-heptane, isooctane and VM&P Naphtha may be used as effective diluents in the thermally-curable silicone backcoat.

The UV-cured silicone backcoat can comprise at least the following: one or more silicone polymers with acrylate or epoxy groups; one or more radiation curable monomers preferably tetrafunctional or greater; and one or more photoinitiators. Acrylate-functional polysiloxanes undergo free-radically-induced polymerization upon exposure to UV light in the presence of a photoinitiator. Epoxy-functional polysiloxanes undergo cationically-induced polymerization upon exposure to UV light in the presence of a cationic photoinitiator. Both silicone acrylate and silicone epoxy polymer units fall under three general categories: 1) silicone polymers with terminal acrylate or epoxy functionality (at chain ends), 2) silicone polymers with pendent acrylate or pendent epoxy functionality (at side of polymer backbone), and 3) silicone acrylate or silicone epoxy polymers varying in chain length. The ratio of silicone acrylate or silicone epoxy polymers over these three general categories dictates the relative ratio of acrylate or epoxy groups to silicone groups in the UV-cured backcoat. The radiation curable monomers can comprise an average functionality of four or larger, or a majority of the at least one radiation curable monomer has an average functionality of four or larger. The radiation curable monomer may comprise an acrylic monomer, such as, for example, an aliphatic urethane hexaacrylate, or an acrylic monomer with hydroxyl functionality, such as, for example, dipentaerythritolhexaacrylate (DPHA). The one or more photoinitiators absorb radiation in the actinic wave band from 220 nm to 410 nm that is generated by conventional mercury UV lamps, absorb at longer select actinic wavelengths, typically 395 nm, 385 nm and 365 nm, that are emitted by LED lamps. An example of a UV photoinitiator for both conventional UV-cure and UV-LED cure that be used includes, but is not limited to, bis-acylphosphineoxide (BAPO). Cationic photoinitiators are strong acid generators derived from sulfonium or iodonium salts comprised of a cationic and anionic pair. An example of a cationic photoinitiator that can be used includes, but is not limited to, triarylsulfonium hexafluoroantimonate salt. The UV-curable silicone backcoat may also include organic solvents used for such purposes as controlling solution viscosity, improving wetting and substrate coating. Examples of organic solvents that can be used include, but are not limited to, ketones, esters, and alcohols, such as, for example, methyl ethyl ketone, butyl acetate and isopropanol. Further, petroleum solvents such as n-heptane, isooctane and VM&P Naphtha may be used as effective diluents in the UV-curable silicone backcoat.

Once the radiation curable topcoat material from the T-panel 102*e* is applied, the card is then transported to the curing station 18 and radiation is applied to the radiation curable topcoat material to cure the topcoat material. The radiation used to cure the radiation curable topcoat material can be any radiation that is suitable for curing the radiation curable topcoat material. For example, in one embodiment, the radiation can be UV radiation. Once cured, the topcoat material protects the underlying printing and increasing the durability of the underlying printing. If the color material from the color material panels 102*a-d* is also radiation curable, the color material may also be radiation cured at the same time as the topcoat material. Alternatively, the color material from the panels 102*a-d* may be applied and then cured, followed by applying the radiation curable topcoat material which is then cured in a separate curing step.

The radiation curable topcoat material from the T-panel 102*e* is preferably transparent or translucent before and after curing. Alternatively, the radiation curable topcoat material from the T-panel 102*e* may be opaque after curing (and optionally prior to being cured). The radiation curable topcoat material may also include security features therein such as fluorescent material and/or an optical variable device such as a hologram or optically variable pigment inks.

Referring to FIG. 10, along with FIGS. 1-2, a method 110 of processing a plastic identification document in a personalized identification document processing system is illustrated. In a step 112, the plastic identification document to be processed is input onto a document transport path. At 114, the plastic identification document is thereafter transported into the print station located along the document transport path. At 116, thermally transferrable color material and thermally transferrable radiation curable protective topcoat material from the print ribbon are applied onto the plastic identification document in the print station, with the applied thermally transferrable radiation curable protective topcoat material partially or completely overlapping the applied thermally transferrable color material. Thereafter, at 118, the plastic identification document is transported into the radiation curing station along the document transport path, and radiation is applied to the applied thermally transferrable radiation curable protective topcoat material to cure the applied thermally transferrable radiation curable protective topcoat material. Thereafter, at 120, the plastic identification document is transported to a document output and the plastic identification document is output.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A personalized identification document processing system, comprising:

a document input that is configured to input a plastic identification document to be processed onto a document transport path to create a personalized plastic identification document;

a print station along the document transport path, the print station includes a thermal print head and a print ribbon that is engageable by the thermal print head to thermally transfer material from the print ribbon to the plastic identification document;

the print ribbon includes a thermally transferrable color material and a thermally transferrable radiation curable protective topcoat material disposed on a carrier film, wherein the thermally transferrable color material and the thermally transferrable radiation curable protective topcoat material are disposed on adjacent panels on the carrier film, the thermally transferrable radiation curable protective topcoat material is dry to the touch or substantially dry to the touch, the thermally transferrable radiation curable protective topcoat material comprises one or more heat-curable monomers and one or more radiation curable monomers, the print station is configured to apply the thermally transferrable radiation curable protective topcoat material over the thermally transferrable color material following printing of the thermally transferrable color material;

a radiation curing station along the document transport path that is configured to apply radiation to the thermally transferrable radiation curable protective topcoat material applied to the plastic identification document from the print ribbon to cure the thermally transferrable radiation curable protective topcoat material on the plastic identification document;

a document output along the document transport path that is configured to receive the plastic identification document; and a document transport mechanism that is configured to transport the plastic identification document along the document transport path.

2. The personalized identification document processing system of claim 1, wherein the radiation curing station includes at least one element that emits ultraviolet curing radiation.

3. The personalized identification document processing system of claim 2, wherein the at least one element comprises a light emitting diode.

4. The personalized identification document processing system of claim 1, wherein the plastic identification document comprises a plastic identification card.

5. The personalized identification document processing system of claim 1, wherein the print ribbon includes a repeating sequence of panels of thermally transferrable material disposed on the carrier film, each sequence of panels includes at least one panel of the thermally transferrable color material followed by at least one panel of the thermally transferrable radiation curable protective topcoat material.

6. The personalized identification document processing system of claim 5, wherein each sequence of panels includes four panels of the thermally transferrable color materials having different colors followed by the at least one panel of the thermally transferrable radiation curable protective topcoat material.

7. The personalized identification document processing system of claim 5, wherein each sequence of panels further includes one or more of the following: a panel of primer material, a panel of optically variable material, and a panel of fluorescent material.

8. The personalized identification document processing system of claim 1, wherein the thermally transferrable radiation curable protective topcoat material is transparent or translucent.

9. The personalized identification document processing system of claim 1, wherein the print ribbon is wound upon itself without a removable interleaf covering the thermally transferrable radiation curable protective topcoat material.

10. The personalized identification document processing system of claim 1, further comprising a backcoat on the carrier film; and the backcoat is disposed on a surface of the carrier film opposite a surface of the carrier film on which the thermally transferrable radiation curable protective topcoat material is disposed.

11. The personalized identification document processing system of claim 1, wherein the print station comprises:

a direct-to-document thermal print station where the thermal print head and the print ribbon print the thermally transferrable radiation curable protective topcoat material directly onto the plastic identification document; or a retransfer print station where the thermal print head and the print ribbon print the thermally transferrable radiation curable protective topcoat material onto a transferrable print receptive layer of a retransfer ribbon, and the transferrable print receptive layer is thereafter transferrable from the retransfer ribbon onto the plastic identification document.

12. The personalized identification document processing system of claim 1, further comprising a second print station along the document transport path, the second print station includes a second thermal print head and a second print ribbon that includes thermally transferrable color material, the second print ribbon is engageable by the second thermal print head to thermally transfer the thermally transferrable color material from the second print ribbon to the plastic identification document.

13. A method of processing a plastic identification document in a personalized identification document processing system, comprising:

inputting the plastic identification document to be processed onto a document transport path;

transporting the plastic identification document into a print station located along the document transport path, the print station includes a thermal print head and a print ribbon that is engageable by the thermal print head to thermally transfer material from the print ribbon to personalize the plastic identification document, the print ribbon includes a carrier film with a thermally transferrable color material and a thermally transferrable radiation curable protective topcoat material disposed on the carrier film, wherein the thermally transferrable color material and the thermally transferrable radiation curable protective topcoat material are disposed on adjacent panels on the carrier film, the thermally transferrable radiation curable protective topcoat material is dry to the touch or substantially dry to the touch, the thermally transferrable radiation curable protective topcoat material comprises one or more heat-curable monomers and one or more radiation curable monomers;

applying the thermally transferrable color material from the print ribbon onto the plastic identification document;

applying the thermally transferrable radiation curable protective topcoat material from the print ribbon onto the plastic identification document over the printed thermally transferrable color material;

thereafter transporting the plastic identification document into a radiation curing station along the document transport path, and applying radiation to the applied thermally transferrable radiation curable protective topcoat material to cure the applied thermally transferrable radiation curable protective topcoat material; and thereafter transporting the plastic identification document to a document output and outputting the plastic identification document.

14. The method of claim 13, comprising applying ultraviolet radiation to the applied thermally transferrable radiation curable protective topcoat material to cure the applied thermally transferrable radiation curable protective topcoat material.

15. The method of claim 13, wherein the plastic identification document comprises a plastic identification card, and comprising:

applying the thermally transferrable color material from the print ribbon onto the plastic identification document using the thermal print head in order to form a portrait image of an intended holder of the plastic identification document; and applying the thermally transferrable radiation curable protective topcoat material from the print ribbon onto the portrait image on the plastic identification document.

16. The method of claim 13, wherein the print ribbon includes a repeating sequence of panels of thermally transferrable material disposed on the carrier film, each sequence of panels includes at least one panel of the thermally transferrable color material followed by at least one panel of the thermally transferrable radiation curable protective topcoat material.

17. The method of claim 16, wherein each sequence of panels includes four panels of the thermally transferrable color materials having different colors followed by the at least one panel of the thermally transferrable radiation curable protective topcoat material.

18. The method of claim 16, wherein each sequence of panels further includes one or more of the following: a panel of primer material, a panel of optically variable material, and a panel of fluorescent material.

19. The method of claim 13, wherein the thermally transferrable radiation curable protective topcoat material is transparent or translucent.

20. The method of claim 13, wherein the print ribbon is wound upon itself without a removable interleaf covering the thermally transferrable radiation curable protective topcoat material.

21. The method of claim 13, further comprising a backcoat on the carrier film; and the backcoat is disposed on a surface of the carrier film opposite a surface of the carrier film on which the thermally transferrable radiation curable protective topcoat material is disposed.

22. The method of claim 13, comprising one of the following:

applying the thermally transferrable radiation curable protective topcoat material from the print ribbon onto the plastic identification document in a direct-to-document process where the thermal print head and the print ribbon print the thermally transferrable radiation curable protective topcoat material directly onto the plastic identification document; or applying the thermally transferrable radiation curable protective topcoat material from the print ribbon onto the plastic identification document in a retransfer printing process where the thermal print head and the print ribbon print the thermally transferrable radiation curable protective topcoat material onto a transferrable print receptive layer of a retransfer ribbon, and the transferrable print receptive layer is thereafter transferrable from the retransfer ribbon onto the plastic identification document.

23. The method of claim 13, further comprising:

in a second print station along the document transport path, applying thermally transferrable color material onto the plastic identification document from a second print ribbon using a second thermal print head.

* * * * *